United States Patent
Zhang et al.

(10) Patent No.: US 9,648,218 B2
(45) Date of Patent: May 9, 2017

(54) REMOTE CONTROL OF A CAMERA MODULE

(71) Applicant: THOMSON LICENSING, Issy-les-Moulineaux (FR)

(72) Inventors: Yanfeng Zhang, Beijing (CN); Zhigang Zhang, Beijing (CN); Xiaojun Ma, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/649,787

(22) PCT Filed: Dec. 13, 2012

(86) PCT No.: PCT/CN2012/086569
§ 371 (c)(1),
(2) Date: Jun. 4, 2015

(87) PCT Pub. No.: WO2014/089807
PCT Pub. Date: Jun. 19, 2014

(65) Prior Publication Data
US 2015/0334285 A1    Nov. 19, 2015

(51) Int. Cl.
*H04N 5/232* (2006.01)

(52) U.S. Cl.
CPC ..... *H04N 5/23206* (2013.01); *H04N 5/23222* (2013.01)

(58) Field of Classification Search
CPC .................................. H04N 5/23225
See application file for complete search history.

(56) References Cited

U.S. PATENT DOCUMENTS 8,081,226 B2 * 12/2011 Yanagidate .............. G03B 7/16
   348/211.1
8,583,088 B2 * 11/2013 Yoshikawa ........ G01C 21/3688
   455/414.1

(Continued)

FOREIGN PATENT DOCUMENTS

CN      1705346     12/2005
CN    101764933      6/2010

(Continued)

OTHER PUBLICATIONS

Search Report.

*Primary Examiner* — Shahbaz Nazrul
(74) *Attorney, Agent, or Firm* — Brian Dorini; Jerome G. Schaefer (57) ABSTRACT

A method performed by a camera module (110) to implement a remote control interface with a mobile device (120) includes establishing a wireless interface association between the camera module (110) and the mobile device (120), and transmitting, by the camera module (110) to the mobile device (120), a remote control file, whereby the mobile device (120) builds and displays a remote control view for the camera module (110). Real-time video frames are then generated in the camera module (110) for transmission to the mobile device (120) and display within the remote control view. The mobile device (120) can then be used to send camera parameter changes to the camera module (110) via the wireless interface. The mobile device (120) remotely monitors and controls the camera module (110).

13 Claims, 6 Drawing Sheets

(56) References Cited

U.S. PATENT DOCUMENTS

| | | | | |
|---|---|---|---|---|
| 8,675,084 | B2* | 3/2014 | Bolton | H04M 1/7253 |
| | | | | 348/211.1 |
| 8,934,045 | B2* | 1/2015 | Karn | H04N 5/23203 |
| | | | | 348/211.99 |
| 8,947,543 | B2* | 2/2015 | Battles | G06F 9/4443 |
| | | | | 348/207.11 |
| 8,976,253 | B2* | 3/2015 | Winbush, III | H04N 5/232 |
| | | | | 348/207.1 |
| 9,189,179 | B2* | 11/2015 | Suzuki | H04N 1/00411 |
| 2005/0275729 | A1* | 12/2005 | Billerbeck | G06F 3/0481 |
| | | | | 348/222.1 |
| 2006/0061663 | A1* | 3/2006 | Park | H04N 5/23293 |
| | | | | 348/211.2 |
| 2006/0067654 | A1* | 3/2006 | Herberger | G06F 3/0481 |
| | | | | 386/231 |
| 2007/0025711 | A1* | 2/2007 | Marcus | G03B 17/38 |
| | | | | 396/56 |
| 2007/0109417 | A1* | 5/2007 | Hyttfors | H04N 5/232 |
| | | | | 348/211.99 |
| 2007/0254640 | A1 | 11/2007 | Bliss | |
| 2008/0070623 | A1* | 3/2008 | Ogawa | H04N 5/232 |
| | | | | 455/556.1 |
| 2010/0079607 | A1 | 4/2010 | Won et al. | |

FOREIGN PATENT DOCUMENTS

| | | |
|---|---|---|
| CN | 102694980 | 9/2012 |
| DE | 102008026690 | 12/2009 |
| JP | 2009267663 | 11/2009 |
| KR | 621088 | 9/2006 |
| KR | 797087 | 1/2008 |

* cited by examiner

Figure 1:
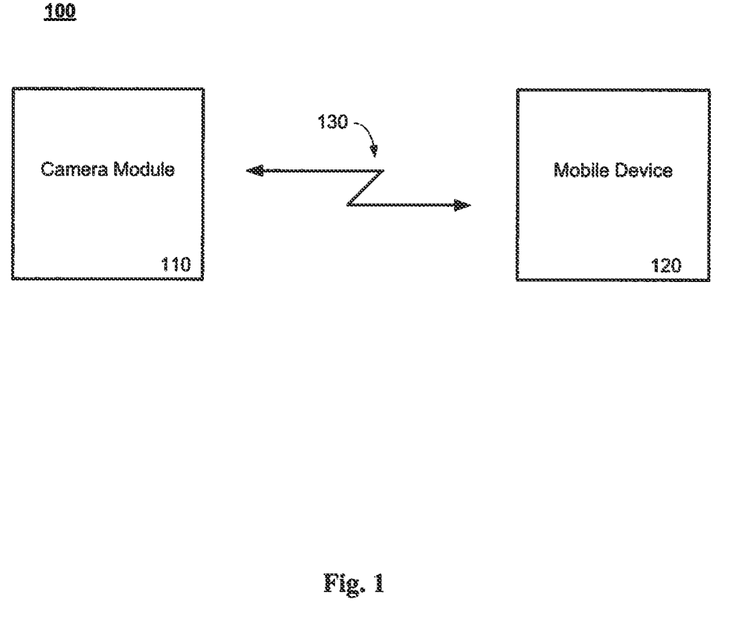

REMOTE CONTROL OF A CAMERA MODULE

This application claims the benefit, under 35 U.S.C. §365 of International Application PCT/CN2012/086569, filed Dec. 13, 2012 which was published in accordance with PCT Article 21(2) on Jun. 19, 2014 in English.

FIELD

The present invention relates to a control and communication system for a camera module. Specifically, the invention relates to the remote control of a camera module using a hand held device.

BACKGROUND

Modern digital cameras have the function of delayed timing picture taking. With this function, a photographer can prepare the background scene, set up the timer for 10, 15, or 20 seconds delay, place himself/herself or any other subject in the scene, and allow the timer to capture a picture or a shot of a scene automatically upon the expiration of the timer. However, this function requires the photographer to prepare the scene and setup the camera carefully beforehand. Once the timer is started, photographer cannot control the camera again for its parameter adjustment, for example, the focal length, the flash usage, and the like. To enable a photographer to more fully and more easily control a camera, various dedicated camera remote controllers have become available. With such a dedicated remote control, a photographer can activate the camera from a distance, place himself in the scene, and control the camera to take photographs. However, most camera remote controllers are designed for a single type of camera or several types of cameras from the same company. Also, these remote control units themselves are dedicated instruments which serve no purpose other than to act a dedicated remote controller for a camera.

SUMMARY

The present invention addresses using a standard mobile device, such as a smart phone, to act as a remote control for a camera module. According to one aspect of the invention, a camera module can be used to recruit a mobile device as a remote control device by programming the mobile device to display a remote control view for the camera module. According to an aspect of the invention, a camera module establishes a peer-to-peer wireless interface association between the camera module and the mobile device. The camera module transmits a remote control file to the mobile device whereby the mobile device builds and displays a remote control view for the camera module. The camera module then generates real-time video frames upon receipt of an activation of remote control view on the mobile device and transmits the real-time video frames from the camera module to the mobile device for display on the mobile device. The mobile device can then function as a remote control device for the camera module via the peer-to-peer wireless interface.

Additional features and advantages of the invention will be made apparent from the following detailed description of illustrative embodiments which proceeds with reference to the accompanying figures.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 1 illustrates a camera module associated with a mobile device according to aspects of the invention;

FIG. 2 illustrates a functional block diagram of a camera module according to aspects of the invention;

FIG. 3 illustrates an example virtual remote control view display for a camera module displayable on the mobile device;

FIG. 4 illustrates an example flow diagram according to aspects of the invention;

FIG. 5 illustrates an example camera module according to aspects of the invention; and FIG. 6 illustrates an example mobile device according to aspects of the invention.

DETAILED DISCUSSION OF THE EMBODIMENTS

In the following description of various illustrative embodiments, reference is made to the accompanying drawings, which form a part thereof, and in which is shown, by way of illustration, various embodiments in the invention may be practiced. It is to be understood that other example embodiments may be utilized and structural and functional modification may be made without departing from the scope of the present invention.

The present invention includes a camera module that functions to use a peer-to-peer (P2P) wireless interface to communicate with a mobile device. The camera module transmits a virtual remote control view manifest file to the mobile device. Upon receipt, the mobile device can build the virtual remote control view on its display. Actuation of controls present on the virtual remote control view displayed on the mobile device can control the camera module using the peer-to-peer interface.

This invention includes the concept of a camera module. A camera module may be either a full or partial camera device that provides the basic camera electronics to control and operate a camera optical system to produce either still pictures or video. As such, the camera module may include the camera optical system or not. A camera module may be used in a camera body that includes the camera optics system. A camera module may be present in a device which is not dedicated to be only a camera (non-camera dedicated device). Examples of camera modules in non-camera dedicated devices include a camera module in a cell phone (smart phone), a camera module in a personal computer, such as a laptop or desktop computer, and a camera module in any instrument or device having a peer-to-peer communication interface, such as a personal digital assistant (PDA). The current invention utilizes a camera module to allow a user photographer to use a mobile device as a remote control for the camera module. The advantage of the current invention over prior art remote controls for camera modules is that any smart mobile device can be used as the remote control even though the mobile device was not specifically constructed to perform as a camera module remote control.

FIG. 1 illustrates one embodiment of an overall architecture 100 of the camera module and mobile device acting as a remote control. FIG. 1 depicts a camera module 110 connected to a mobile device 120 using a peer-to-peer (P2P) link 130. The link 130 allows communication between the camera module and the mobile device such that the mobile device can act as a remote control. In one aspect of the invention, the mobile device 120 is programmed by the camera module 110 using the P2P interface 130 whereby the mobile device can become a remote control unit for the camera module. The mobile device may be any mobile device such as a personal computer (PC), a hand-held compact computer core, a smart phone, a programmable digital assistant, or the like. In one embodiment, a smart phone, such as a cell phone with a P2P interface is an example of a mobile device. The mobile device need only have access to a P2P interface, be capable of being programmed, and have a user display to be useable in the configuration of FIG. 1.

Figure 2:
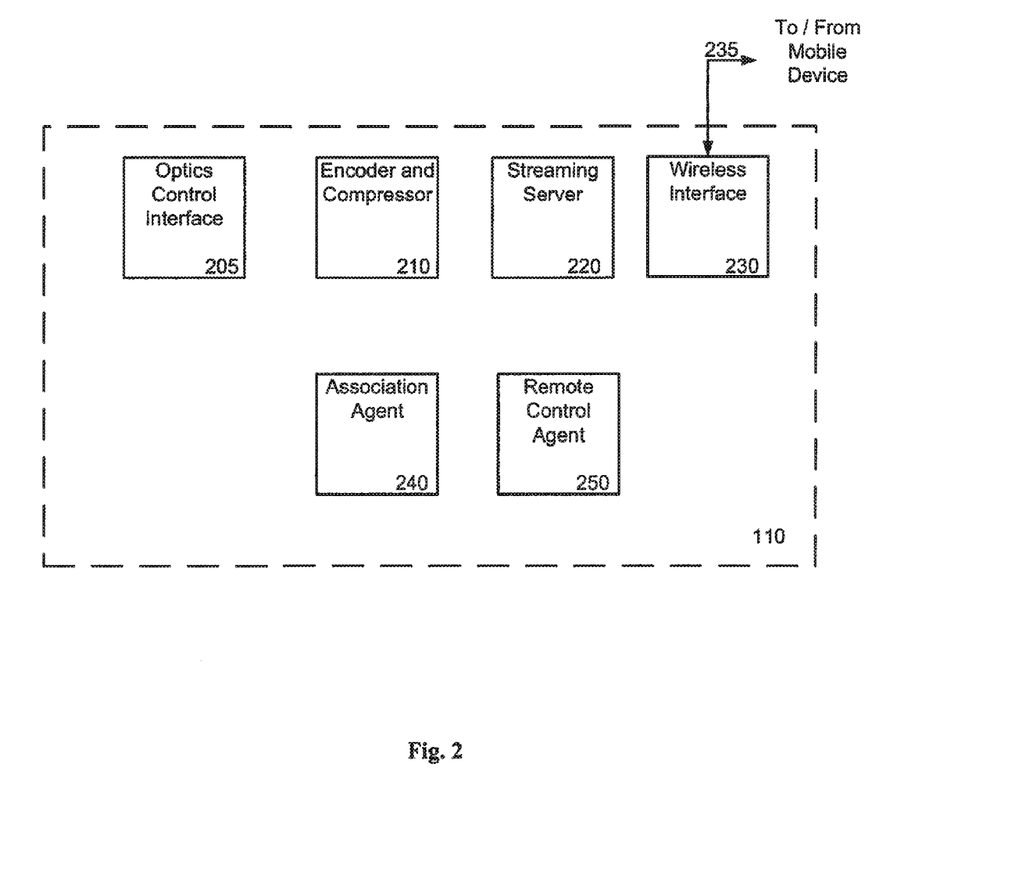

FIG. 2 depicts one embodiment of a camera module 110 functional block diagram. The camera module 110 includes an optics control interface 205, an encoder and compression function 210, a streaming server 220, a wireless interface 230, an association agent 240, and a remote control agent 250. The optics control interface 205 functions to accept commands to control the optical system related to the camera module. Such commands include instructions for selection of picture resolution, picture quality, ISO value, and focus levels, and the like. The encoder and compressor function 210 serves to encode and compress video produced by the camera module for transport to the mobile device acting as a camera remote control. The streaming server 220 functions to supply the encoded and compressed video to the mobile device via the wireless interface 230. The wireless interface 230 functions to control a physical communication channel for peer-to-peer communications between the camera module 110 and the mobile device. An association agent 240 functions to establish an association between P2P agents such as between the camera module 110 and the mobile device 120. The association agent 240 can detect, identify, associate, and authenticate with P2P mobile devices capable of acting as a remote control for the camera module. The remote control agent 250 serves to transmit and receive commands compatible as remote control commands between the camera module 110 and a mobile device 120. The architecture of the camera module 110 allows the camera module to build an association with a photographer's mobile device, such as a smart phone, invoke a virtual remote control view on the mobile device, enable the photographer to adjust photography parameters of the camera module using the mobile device as a remote control, and respond to a photographer's command to take a picture (shot). In the embodiment where the mobile device is a smart phone, the smart phone can act as a remote control for the camera module in another smart phone. In other embodiments, a mobile device can act as a remote control for a camera module in a laptop or desktop computer, a personal digital assistant, or any camera module located in any instrument, such as a hand-held or fixed-mount non-camera dedicated device.

In one aspect of the invention, the association agent 240 uses the wireless interface 230 to build a P2P wireless connection with the photographer's mobile device, such as a smart phone. The wireless interface implements a P2P interface transmission exchange between the camera module and the mobile device with any well known wireless communication technology, such as IEEE 802.11, Bluetooth, ultra-wideband (UWB), wireless optical, infra-red communication, and the like. The wireless communication technology adopted ideally provides sufficient bandwidth for a real-time compressed video stream to be transmitted from the camera module to the mobile device. With the P2P connection, a photographer's mobile device can associate with the camera using an authentication and authorization process.

After building the association between the camera module and the mobile device, the remote agent 250 sends an extensible markup language (XML) formatted remote control file to the mobile device. The XML file is a remote control manifest file. The XML manifest file specifies a virtual remote control view's layout, displayable on the mobile device. The resulting virtual remote control view on the mobile device's display contains the available adjustable control parameters and also includes other remote control buttons. The mobile device, such as a smart phone, uses the XML file information to form a virtual remote control view on its display, such as a touch screen display on a smart phone.

One example of the XML remote control manifest file is gives as follows.

```
<?xml version="1.0" encoding="utf-8"?>
<Linear Layout
xmlns:android="http://schemas.android.com/apk/res/android">
    <VideoView id="@+id/videoView1"/>
        <TextView text="ISO" id="@=id/textView1"></TextView>
        <Spinner id="@+id/spinner1"></Spinner>
        <TextView text="Quality" id="@+id/textView2"></TextView>
        <Spinner id="@+id/spinner2"></Spinner>
        <TextView text="Resolution"
        id="@=id/textView4"></TextView>
        <Spinner id="@+id/spinner3"></Spinner>
        <TextView text="Focus" id="@=id/textView3"></TextView>
        <ProgressBar id="@+id/progressBar1"></ProgressBar>
        <CheckBox text="Flash" id="@+id/checkBox1"></CheckBox>
        <Button text="Remote control"
        android:id="@+id/button1"></Button>
        <Button text="Shot" id+"@+id/button2"></Button
<Linear Layout>
```

The remote control XML file, when loaded and installed by the mobile device, enables the mobile device to display a remote control panel for the camera module on the display of the mobile device. One example of such a remote control view displayed on the mobile device display is the smart phone display of FIG. 3. Here, within the controls represented by the XML file loaded onto the mobile device smart phone, camera module photography parameters can be adjusted or selected. Parameters such as picture resolution, picture quality, ISO value, and focus levels, and the like may be adjusted by using the virtual remote controls on the mobile device. For example, the ISO value of the camera module can be selected as 80, 100, 200, 400, 800, 1600, 3200, and the like from the ISO pulling-down list by the photographer using the mobile device as a remote control for the camera module. Within the remote control view provided on the mobile device, a photographer can adjust the corresponding parameters, switch modes, and the like, via sent commands to the camera module via the P2P interface.

Figure 3:
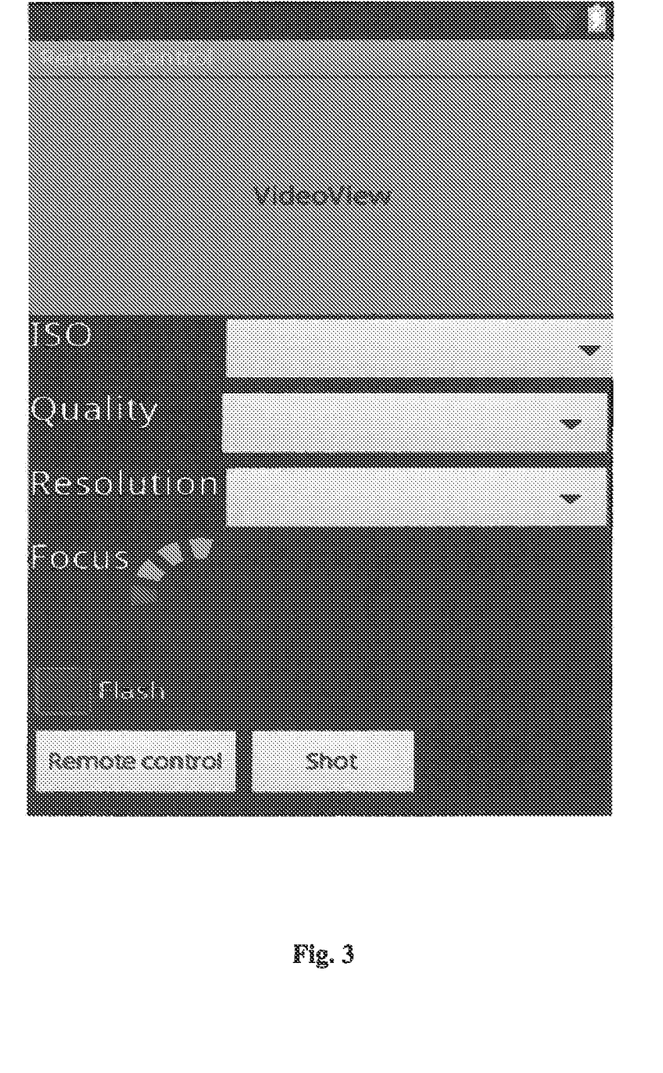

FIG. 3 depicts the remote control view display of the real-time video that is transferred to the mobile device from the camera module. Also depicted are ISO, Quality, and Resolution drop down menus offering photography parameter selection options for the photographic user of the camera module. Focus, flash, and picture taking shot control features are also shown. Activation of the remote command view displayed on the mobile device is accomplished by activating the remote control button on the FIG. 3 example. Activation of the remote control view can also be accomplished automatically after the XML file is loaded into the mobile device using the P2P wireless interface.

Figure 4:
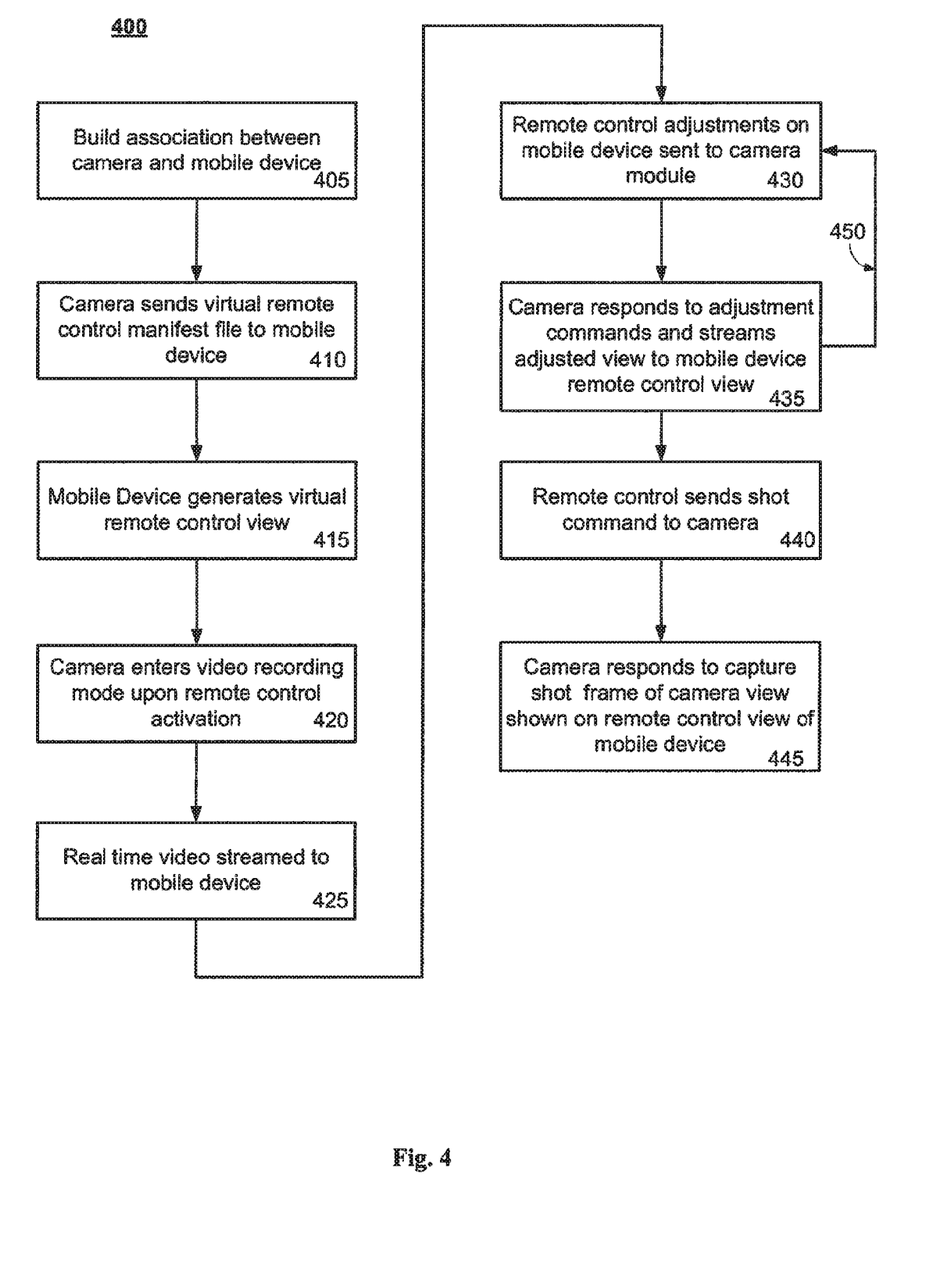

FIG. 4 depicts an example flow diagram 400 of a method to use the invention to setup and control a camera module with a mobile device. At step 405, an association is built between the camera and the mobile device using the P2P wireless interface. The association allows the camera module and at least one mobile terminal to exchange information in order to effectuate a remote control interface of the camera module using the mobile device. At step 410, the camera module transmits the virtual remote control manifest file to the mobile device using the P2P connection. In one embodiment the remote control manifest file is an XML file. At step 415, the remote control file is used to set up a remote control view display on the mobile device. In the embodiment of the smart phone being the mobile device, the smart phone builds the virtual remote control view on its touch screen display.

At step 420, the camera enters a video recording mode upon activation of the remote control functionality now present in the mobile device. Activation can occur automatically upon execution of the XML remote control file by the mobile device, or upon a manual activation of the remote control view by a user of the mobile device. In either event, the camera module receives an activation indication from the mobile device and the camera module begins recording video to send to the mobile device. The video that is being captured or buffered (recorded) is video representing the image as viewed by the optics associated with the camera module. Such video represents the picture scene viewed by the camera module. In the embodiment of a smart phone as the mobile device, the user photographer presses the remote control button on the touch screen, as shown in FIG. 3, to start the camera module remote control function. The smart phone then sends a command to the camera module to begin video capture (recording) in real-time.

At step 425, the encoding and compression function may be used to encode real-time captured video from the camera module and stream the encoded real-time video to the mobile device via the P2P connection. Compression of video is applied if needed to transfer the encoded real-time video across the wireless P2P interface. As a result, of the streaming, the real-time video is displayed on the virtual remote view of the mobile device. This allows the user photographer to see on the mobile device virtual remote control view what the camera module is viewing. Here, the term "real-time video" essentially encompasses any delay in immediate processing and transmission and reception between the camera module and the mobile device.

At step 430, adjustments can be made at the virtual remote control view on the mobile device to alter the camera module photography parameters. Upon the adjustment of parameters, corresponding commands are transmitted from the mobile device to the camera module via the P2P wireless interface. As a result, at step 435, the camera module responds to the user photographer's commands received via the virtual remote control view of the mobile device by making the corresponding camera module adjustments. If the adjustments affect the displayed parameters or camera view, those changes are seen at the mobile device as the real-time video is changed. For example, if a user photographer changes the focus on the mobile device, the camera module would respond accordingly and the real-time video transmitted to the mobile device would indicate the change in focus on the subject matter within the camera module's field of view. In one aspect of the invention, real-time video is continuously sent to the mobile device, and as such, any changes made by the user photographer to change the camera module's view can be seen at the virtual remote control view of the mobile device. Steps 430 and 435 can be repeated in a loop 450 as needed for the user photographer to set up the camera module to view subject matter within the camera module's field of view.

At this point, the user photographer may wish to capture a specific scene or subject matter by capturing a single image or shot. At step 440 the user photographer can actuate a button on the virtual remote control view of the mobile device to send a command to the camera module to capture a shot. As a result, in step 445, the camera module responds to the shot command by capturing an image in the field of view of the camera module. In actuality, the camera module captures the shot image local to the camera module and stores the shot in camera-accessible memory as in any camera module. Stated another way, upon receiving the "shot" command, the camera module switches its mode into photographing mode, and uses the photographic parameters to capture a picture.

Figure 5:
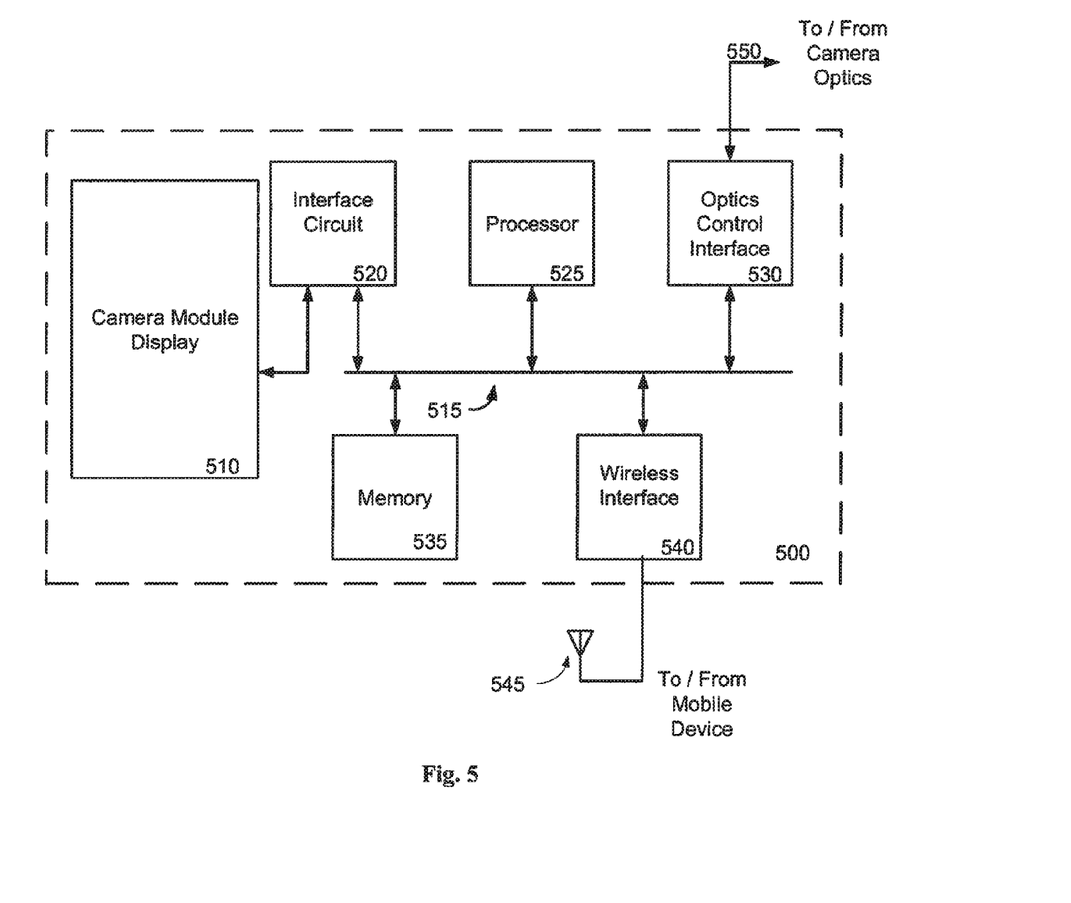

FIG. 5 depicts one embodiment of a camera module block diagram 500. As indicated before, a camera module may or may not be a complete camera device. A camera module may be the electronics to control the optics of a fully self-contained camera or the term "camera module" may be descriptive of an entire fully self-contained camera device. Device 500 may contain an interface circuit 520 to couple a camera module display 510 with the internal circuitry of the device, such as an internal bus 515 as is known in the art. FIG. 5 depicts a bus implementation, but other implementations are applicable and are well-known in the art. A processor 525 assists in controlling the various bus interfaces and resources for the camera module 500. Those resources include a local memory 535 used for program and/or data storage and well as an optical control interface 530. A program stored in memory can function to implement the flow diagram of FIG. 4. The optical control interface 530 is used to control the electro-mechanical optical components and setting of a camera. A wireless interface 540 is used for the P2P interface and is bussed as are the other components, to the control processor 525 and each other. Antenna 545 serves the wireless interface as a communication element for the P2P interface functionality.

Figure 6:
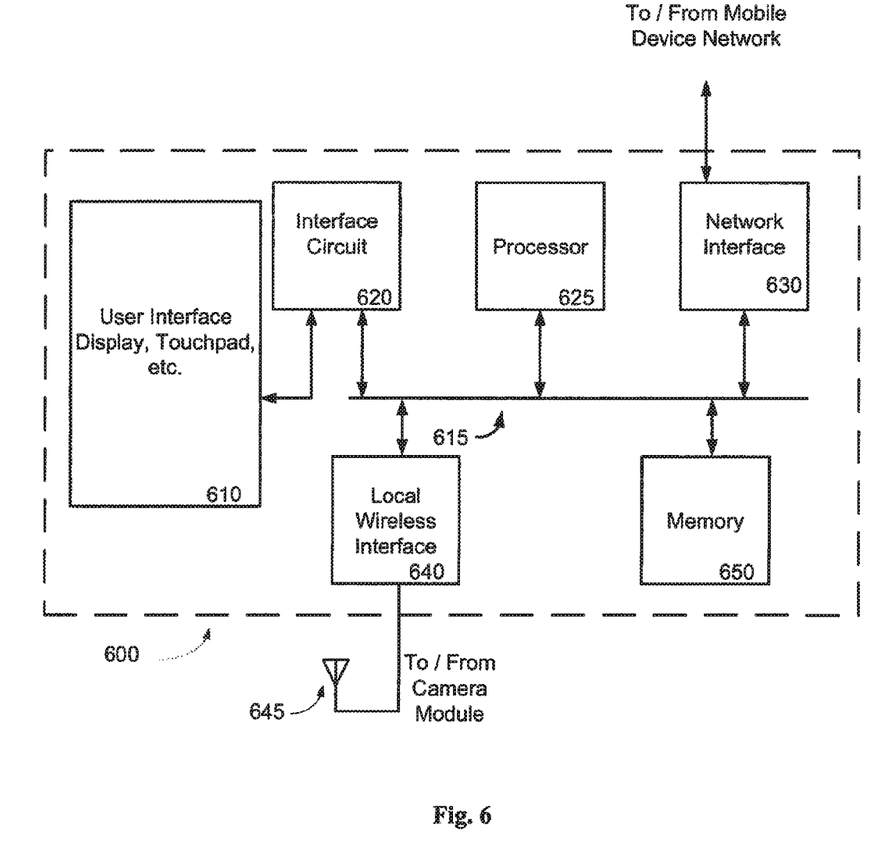

FIG. 6 is a depiction of a mobile device 600 block diagram. As indicated above, the mobile device includes a wireless interface 640 to be used as the P2P interface via antenna 645. An interface circuit 620 serves to couple a mobile device display, such as a touch screen display, to an internal connection to a processor 625 and memory 630. If the mobile device is a smart phone, then cellular interface 630 may also be present.

The processor 625 performs control functions for the mobile device as well as providing the computation resources for generation of a virtual remote control view via a P2P interface-received remote control manifest file. It is processor 625, in conjunction with the remote control file received from the camera module, which aids in transforming the mobile device into a remote control for the camera module. The processor 625 acts to execute a program, in software, firmware, or hardware, using the remote control manifest file, to create the remote control view for the camera module. Memory 650 works in conjunction with processor 625 to store program and file information.

Although specific architectures are shown for the implementation of a camera module as shown in FIG. 5, and a mobile device as shown in FIG. 6, one of skill in the art will recognize that implementation options exist such as distributed functionality of components, consolidation of components, and use of internal busses or not. Such options are equivalent to the functionality and structure of the depicted and described arrangements.

The invention claimed is:

1. A method performed by a camera module to implement a remote control interface with a mobile device, the method comprising:
    establishing a wireless interface association between the camera module and the mobile device using a peer-to-peer interface;
    transmitting, by the camera module to the mobile device, a remote control file to be installed on the mobile device, whereby the mobile device uses the remote control file to build and display a remote control view for controlling the camera module at the mobile device, the remote control view including real-time video frames and virtual remote controls for adjusting parameters of the camera module;
    upon receipt of an indication of activation of the remote control file from the mobile device and entry into a video recording mode, transmitting the real-time video frames from the camera module to the mobile device for display in the remote control view with the virtual remote controls on the mobile device;
    receiving a remote command from the mobile device to control the camera module;
    adjusting parameters of the real-time video frames in response to receipt of the remote control command; and
    transmitting adjusted real-time video frames to the mobile device;
    wherein the transmitting and receiving use the peer-to-peer interface.

2. The method of claim 1, wherein transmitting, by the camera module to the mobile device, a remote control file comprises transmitting an extended markup language file to the mobile device to build a remote control view for the camera module on the mobile device.

3. The method of claim 1, wherein receipt of the indication of activation of the remote control file from the mobile device comprises receipt of an activation message upon activation of the remote control view by a user the mobile device.

4. The method of claim 1, wherein receiving a remote command from the virtual remote control of the mobile device to control the camera module comprises receiving a remote command to adjust one or more of picture resolution, picture quality, ISO value, and focus.

5. The method of claim 1, wherein transmitting adjusted real-time video frames to the mobile device displays a parameter response change on the mobile device.

6. The method of claim 1, further comprising receiving a command sent by the mobile device to capture a video frame as a picture shot for storage by the camera module.

7. A camera module apparatus using a mobile device as a remote control, the apparatus comprising:
    a wireless peer-to-peer interface used to transfer a remote control file to the mobile device, the remote control file used to build and display a remote control view for the camera module on the mobile device;
    a processor that executes a program to control operation of the camera module, wherein camera operation includes (a) transmitting the remote control file to be installed on the mobile device using the wireless peer-to-peer interface whereby the mobile device uses the remote control file to build and display a remote control view including real-time video frames and virtual remote controls for adjusting parameters of the camera module for controlling the camera module at the mobile device, (b) upon receipt of an indication of activation of the remote control file from the mobile device and entry into a video recording mode, capturing, encoding, and transmitting, via the wireless peer-to-peer interface, the real-time video frames to the mobile device for display in the remote control view with the virtual remote controls, and (c) receipt of camera module commands via the wireless peer-to-peer interface, the commands generated by the mobile device; and
    memory available to the processor for storing the program.

8. The camera module apparatus of claim 7, further comprising an encoding and compression module useful for encoding and compressing real-time video frames of the camera module prior to transmission to the mobile device.

9. The camera module apparatus of claim 7, further comprising a streaming server module to transmit real-time video frames to the mobile device.

10. The camera module apparatus of claim 7, further comprising an association agent to establish an association between the mobile device using the wireless peer-to-peer interface.

11. The camera module apparatus of claim 7, further comprising a remote control agent to control and monitor the remote control activity of the mobile device.

12. The camera module apparatus of claim 7, wherein the mobile device is one of a smart phone, a handheld computer, a laptop computer, and a programmable digital assistant.

13. The camera module apparatus of claim 7, wherein the wireless peer-to-peer interface comprises a peer-to-peer interface on a smart phone, a laptop computer, a desktop computer, a personal digital assistant, or a camera.

* * * * *